US011787397B2

(12) United States Patent
Gould et al.

(10) Patent No.: US 11,787,397 B2
(45) Date of Patent: Oct. 17, 2023

(54) VEHICLE CARGO MANAGEMENT SYSTEMS

(71) Applicant: FORD GLOBAL TECHNOLOGIES, LLC, Dearborn, MI (US)

(72) Inventors: Aaron Gould, Detroit, MI (US); Stuart C. Salter, White Lake, MI (US); John Robert Van Wiemeersch, Novi, MI (US); Paul Kenneth Dellock, Northville, MI (US); David Brian Glickman, Southfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 221 days.

(21) Appl. No.: 17/153,349

(22) Filed: Jan. 20, 2021

(65) Prior Publication Data

US 2022/0227356 A1 Jul. 21, 2022

(51) Int. Cl.
*B60W 30/08* (2012.01)
*B60W 50/14* (2020.01)
*H04W 4/029* (2018.01)

(52) U.S. Cl.
CPC ............ *B60W 30/08* (2013.01); *B60W 50/14* (2013.01); *H04W 4/029* (2018.02);
(Continued)

(58) Field of Classification Search
CPC ................. B60W 30/08; B60W 50/14; B60W 2050/143; B60W 2420/42; B60W 2420/52; B60W 2422/95; H04W 4/029
(Continued)

(56) References Cited

U.S. PATENT DOCUMENTS

| 6,177,868 B1 * | 1/2001 | Hollingsworth | B60Q 9/00 180/41 |
| 6,334,490 B1 * | 1/2002 | Dille | A62C 3/07 239/311 |

(Continued)

FOREIGN PATENT DOCUMENTS

| GB | 2568976 B | 6/2020 |
| RU | 2355595 C1 | 5/2009 |

(Continued)

OTHER PUBLICATIONS

Yousef et al., "Monocular Video-Based Trailer Coupler Detection Using Multiplexer Convolutional Neural Network," 2017, Publisher: IEEE.*

(Continued)

*Primary Examiner* — Tuan C To

(74) *Attorney, Agent, or Firm* — Vichit Chea; Carlson, Gaskey & Olds, P.C.

(57) ABSTRACT

This disclosure details cargo management systems for monitoring the regulatory compliance of cargo positioned on a vehicle. Exemplary cargo management systems may be configured to estimate a distance an item of cargo extends beyond a perimeter of the vehicle and then compare the estimated distance with a cargo-related regulation to confirm compliance of the item of cargo with the cargo-related regulation. The cargo management system may further be configured to detect positional changes of the item of cargo to ensure continued compliance of the item of cargo with the cargo-related regulation during vehicle operation. The cargo management system may issue an alert when the item of cargo is determined to be non-compliant with the cargo-related regulation or when the item of cargo shifts during vehicle operation.

19 Claims, 4 Drawing Sheets

(52) U.S. Cl.
CPC ... *B60W 2050/143* (2013.01); *B60W 2420/42* (2013.01); *B60W 2420/52* (2013.01); *B60W 2422/95* (2013.01)

(58) Field of Classification Search
USPC .......................................................... 701/1
See application file for complete search history.

(56) References Cited

U.S. PATENT DOCUMENTS

| | | | | |
|---|---|---|---|---|
| 9,488,482 | B2* | 11/2016 | Chan ..................... | G08G 1/165 |
| 10,089,872 | B1* | 10/2018 | Beaurepaire ........... | G08G 1/143 |
| 2004/0008514 | A1* | 1/2004 | Lee ......................... | G08G 1/04 |
| | | | | 362/259 |
| 2004/0075847 | A1* | 4/2004 | McCracken ............ | G01B 11/02 |
| | | | | 356/622 |
| 2005/0240317 | A1* | 10/2005 | Kienzle-Lietl ......... | G01B 11/00 |
| | | | | 700/303 |
| 2007/0103282 | A1* | 5/2007 | Caird ...................... | G08G 1/165 |
| | | | | 340/686.6 |
| 2008/0072444 | A1* | 3/2008 | Harrill .................... | G01B 11/002 |
| | | | | 33/600 |
| 2009/0121852 | A1* | 5/2009 | Breuer .................... | G08G 1/165 |
| | | | | 340/436 |
| 2009/0184811 | A1* | 7/2009 | Althoff ................... | G08G 1/165 |
| | | | | 340/686.6 |
| 2011/0276215 | A1* | 11/2011 | Wendling ................ | G07C 5/008 |
| | | | | 701/1 |
| 2013/0099910 | A1* | 4/2013 | Merritt .................... | G01S 17/04 |
| | | | | 340/438 |
| 2013/0222592 | A1* | 8/2013 | Gieseke ........... | G08G 1/096708 |
| | | | | 348/148 |
| 2015/0066349 | A1* | 3/2015 | Chan ................... | G01C 21/3697 |
| | | | | 701/400 |
| 2016/0119539 | A1* | 4/2016 | Tan ........................ | G01S 5/0284 |
| | | | | 348/148 |
| 2018/0328757 | A1 | 11/2018 | Chan et al. | |
| 2020/0130678 | A1 | 4/2020 | Gotoda et al. | |

FOREIGN PATENT DOCUMENTS

| | | | | |
|---|---|---|---|---|
| WO | WO-2020117111 | A1 * | 6/2020 | ......... B60G 17/0165 |
| WO | 2020/143883 | A1 | 7/2020 | |
| WO | WO-2020222680 | A1 * | 11/2020 | ........... G06Q 10/083 |

OTHER PUBLICATIONS

Yiran et al., "Overload and Load Centroid Recognition Method Based on Vertical Displacement of Body," 2019, Publisher: IEEE.*

* cited by examiner

VEHICLE CARGO MANAGEMENT SYSTEMS

TECHNICAL FIELD

This disclosure relates to motor vehicles, and more particularly to vehicle cargo management systems capable of monitoring the regulatory compliance of cargo positioned on the vehicle.

BACKGROUND

Motor vehicles typically include cargo spaces for transporting various types of cargo. Various regulations may establish limits on the distance that cargo can extend beyond the perimeter of the vehicle.

SUMMARY

A cargo management system for a vehicle according to an exemplary aspect of the present disclosure includes, among other things, a sensor system adapted to detect an item of cargo located on the vehicle, and a control module in electronic communication with the sensor system and configured to estimate a distance the item of cargo extends beyond a perimeter of the vehicle and compare the estimated distance with a cargo-related regulation to confirm compliance of the item of cargo with the cargo-related regulation.

In a further non-limiting embodiment of the foregoing cargo management system, the sensor system includes a plurality of sensors and a plurality of cameras.

In a further non-limiting embodiment of either of the foregoing cargo management systems, the sensor system includes at least one of a front camera, a rear camera, a side camera, an ultrasonic sensor, a radar sensor, or combinations thereof.

In a further non-limiting embodiment of any of the foregoing cargo management systems, the sensor system includes a lamp assembly including a radar sensor and a camera.

In a further non-limiting embodiment of any of the foregoing cargo management systems, the lamp assembly is a center high mounted stop lamp (CHMSL).

In a further non-limiting embodiment of any of the foregoing cargo management systems, a telecommunications module is adapted to achieve bidirectional communication with a server system having a data repository for storing the cargo-related regulation.

In a further non-limiting embodiment of any of the foregoing cargo management systems, a global positioning system (GPS) is configured to detect a location of the vehicle. The control module is configured to determine whether the cargo-related regulation is relevant to the vehicle based on the location.

In a further non-limiting embodiment of any of the foregoing cargo management systems, the control module is configured to detect a positional change of the item of cargo during motion and/or stopping of the vehicle.

In a further non-limiting embodiment of any of the foregoing cargo management systems, the control module is configured to command an alert in response to detecting the positional change of the item of cargo.

In a further non-limiting embodiment of any of the foregoing cargo management systems, a cargo tagging device is secured to the item of cargo and includes a wireless device that is detectable by the control module.

In a further non-limiting embodiment of any of the foregoing cargo management systems, the control module is configured to command an alert when the item of cargo is non-compliant with the cargo-related regulation.

In a further non-limiting embodiment of any of the foregoing cargo management systems, the alert is an audible alert, a message displayed on a human machine interface of the vehicle, a message displayed on a personal electronic device of an operator of the vehicle, or a message displayed on a computer of an administrator of the vehicle.

A method according to another exemplary aspect of the present disclosure includes, among other things, estimating, via a control module of a vehicle cargo management system, a distance an item of cargo extends beyond a perimeter of a vehicle, and comparing, via the control module, the distance the item of cargo extends beyond the perimeter of the vehicle with a cargo-related regulation.

In a further non-limiting embodiment of the foregoing method, the method includes notifying an operator associated with the vehicle when the item of cargo is non-compliant with the cargo-related regulation.

In a further non-limiting embodiment of either of the foregoing methods, the estimating includes receiving, at the control module, a sensor input from a sensor system of the cargo management system.

In a further non-limiting embodiment of any of the foregoing methods, the sensor input includes an image of the item of cargo captured by a camera.

In a further non-limiting embodiment of any of the foregoing methods, the sensor input includes data concerning the item of cargo captured by a radar sensor.

In a further non-limiting embodiment of any of the foregoing methods, the method includes monitoring for a positional change of the item of cargo during operation of the vehicle.

In a further non-limiting embodiment of any of the foregoing methods, the method includes notifying an operator associated with the vehicle in response to detecting the positional change of the item of cargo.

In a further non-limiting embodiment of any of the foregoing methods, the estimating includes communicating with a cargo tagging device of the item of cargo in order to detect the item of cargo.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details cargo management systems for monitoring the regulatory compliance of cargo positioned on a vehicle. Exemplary cargo management systems may be configured to estimate a distance an item of cargo extends beyond a perimeter of the vehicle and then compare the estimated distance with a cargo-related regulation to confirm compliance of the item of cargo with the cargo-related regulation. The cargo management system may further be configured to detect positional changes of the item of cargo to ensure continued compliance of the item of cargo with the cargo-related regulation during vehicle operation. The cargo management system may issue an alert when the item of cargo is determined to be non-compliant with the cargo-related regulation or when the item of cargo shifts during vehicle operation or is moved by a user or occupant of the vehicle. These and other features of this disclosure are described in greater detail below.

Figure 1:
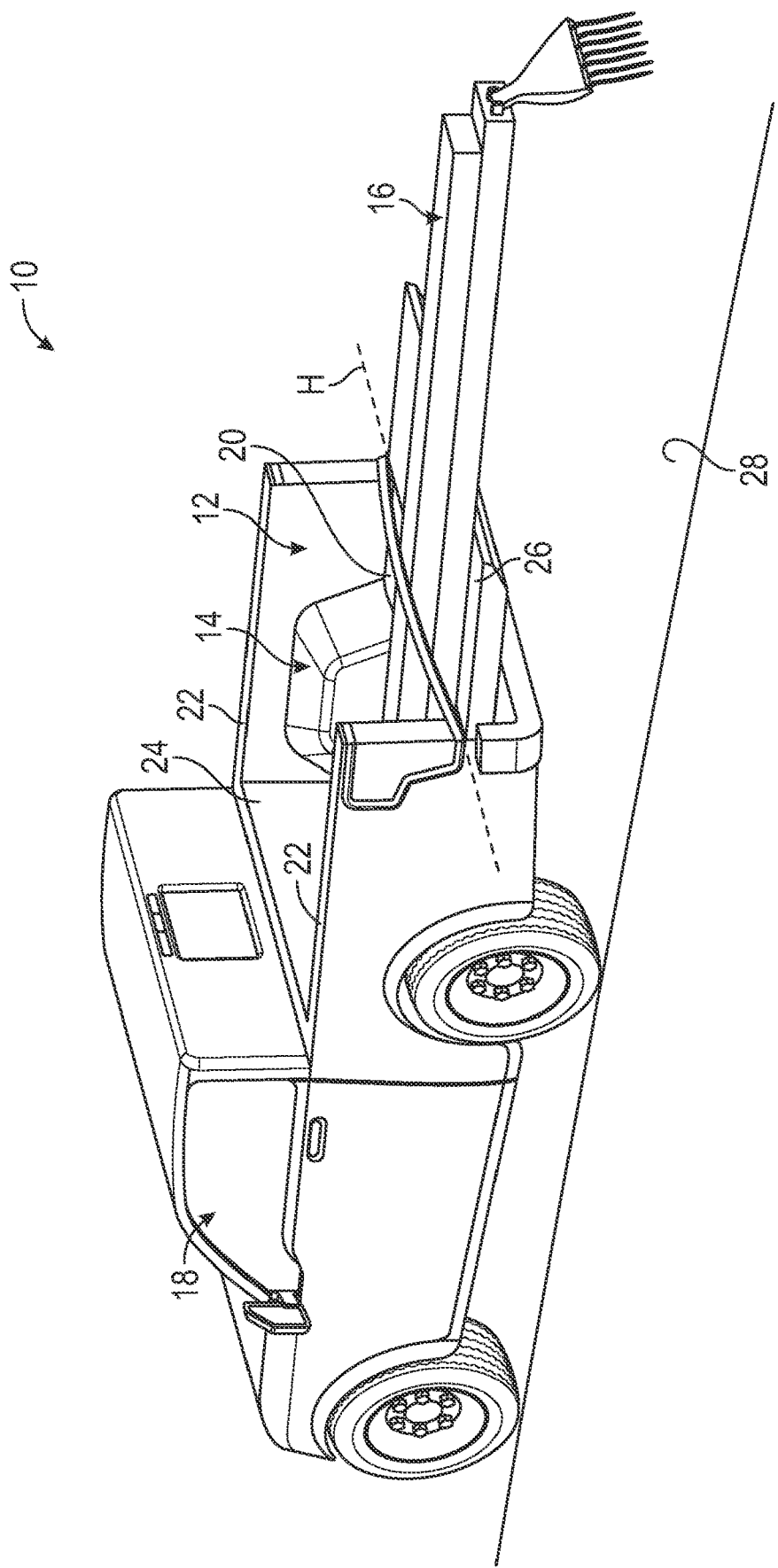
FIG. 1 illustrates a motor vehicle equipped with a cargo space for storing and hauling cargo.

FIG. 1 illustrates a motor vehicle 10 that includes a cargo space 12. In the illustrated embodiment, the vehicle 10 is a pickup truck. While a pickup truck is specifically pictured and referenced herein, other vehicles could also benefit from the teachings of this disclosure. For example, the exemplary cargo management systems described in this disclosure could be used to monitor cargo positioned on or within a sport utility vehicle, a sedan, a van, or any other type of vehicle. The vehicle 10 could also be a conventional, internal combustion engine powered vehicle, a traction battery powered electric or hybrid vehicle, an autonomous vehicle (i.e., a driverless vehicle), etc.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component.

In the exemplary embodiment of FIG. 1, a truck bed 14 establishes the cargo space 12 for storing and hauling one or more items of cargo 16 on the vehicle 10. The cargo space 12 is generally rearward of a passenger cabin 18 of the vehicle 10 and includes a floor 20 extending between a pair of longitudinally extending side walls 22, a laterally extending front wall 24, and a tailgate 26.

The tailgate 26 is moveable between a closed position and a deployed or open position. When in the closed position, the tailgate 26 generally encloses an end of the cargo space 12 that is opposite from the front wall 24. The tailgate 26 may be pivoted about a generally horizontal axis H for movement between the closed and open positions to provide access to the cargo space 12. When in the open position, the tailgate 26 is generally horizontal and is parallel to a ground surface 28 such that the cargo 16 can be loaded onto or unloaded from the cargo space 12.

The owner or user of the vehicle 10 may transport various types of cargo using the vehicle 10. In an embodiment, the cargo 16 may include long stock cargo having a length dimension that is greater than its width dimension. The long stock cargo could extend across a majority of the length of the cargo space 12, or could even be longer than the cargo space 12 such that it extends beyond the rear-most surfaces of the vehicle 10. Lumber (e.g., two-by-fours), canoes, boats, and ladders are non-limiting examples of the types of long stock cargo that could be positioned and hauled within the cargo space 12.

Local, state/province, and/or federal regulations (e.g., ordinances, rules, laws, etc.) may set limits on the distance that the cargo 16 can extend beyond an outer perimeter of the vehicle 10 at each of the front, rear, and sides of the vehicle 10. Owners or operators of the vehicle 10 may be unaware of such cargo-related regulations. This disclosure is therefore directed to cargo management systems adapted for monitoring the regulatory compliance of the cargo 16 and for alerting the owner/operator of the vehicle 10 when the cargo 16 is non-compliant with the cargo-related regulations.

Figure 2:
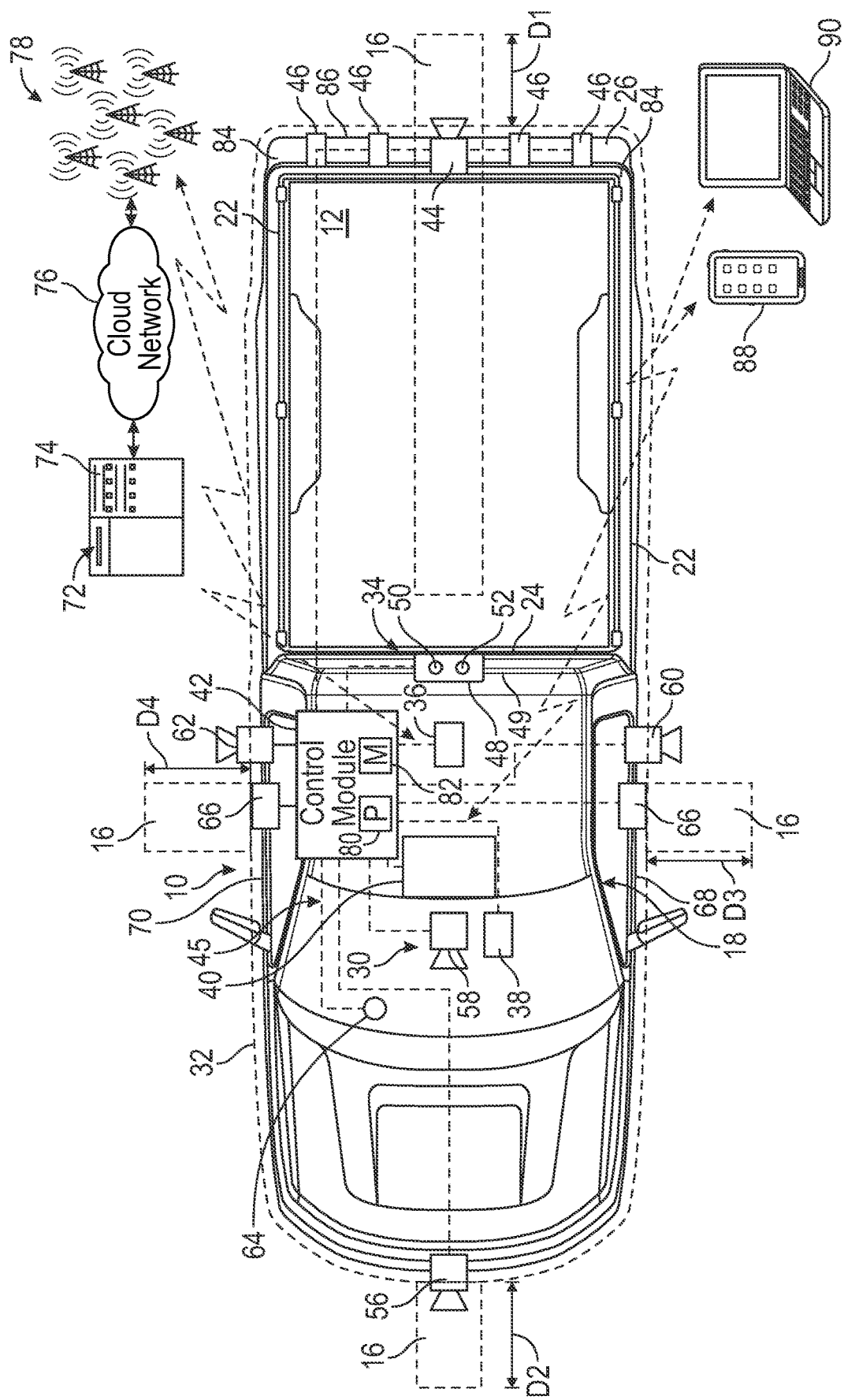
FIG. 2 schematically illustrates an exemplary vehicle cargo management system for monitoring cargo positioned on a vehicle.

FIG. 2 illustrates an exemplary cargo management system 30 for monitoring the regulatory compliance of the cargo 16 of the vehicle 10 of FIG. 1 or any other vehicle capable of carrying cargo. As further detailed below, the cargo management system 30 is capable of estimating a distance the item of cargo 16 extends beyond a perimeter 32 of the vehicle 10 and then comparing the estimated distance with a cargo-related regulation to confirm compliance of the item of cargo 16 with the cargo-related regulation.

The cargo management system 30 may include a sensor system 34, a telecommunications module 36, a global positioning system (GPS) 38, a human machine interface (HMI) 40, and a control module 42. Each of these components may be interconnected and in electronic communication with one another over a communication bus 45. The communication bus 45 may be a wired communication bus such as a controller area network (CAN) bus, or a wireless communication bus such as Wi-Fi, Bluetooth®, Ultra-Wide Band (UWB), etc.

The sensor system 34 may include a multitude of sensors and cameras for monitoring the environment in and around the vehicle 10. In an embodiment, the sensor system 34 is adapted for monitoring each of the front, rear, driver side, and passenger side of the vehicle 10.

Figure 3:
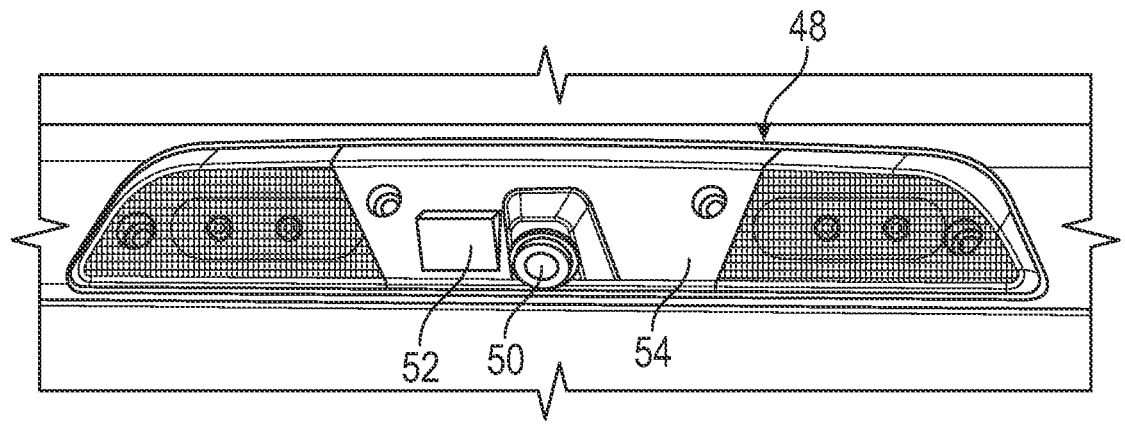
FIG. 3 illustrates an exemplary lamp assembly of the cargo management system of FIG. 2.

The sensor system 34 may include a rear camera 44, one or more rear ultrasonic sensors 46, and a lamp assembly 48 for monitoring the rear of the vehicle 10. In an embodiment, the lamp assembly 48 is a center high mounted stop lamp (CHMSL) mounted to a rear facing surface of a vehicle body 49 (here, a rear facing portion of the vehicle roof that extends above the front wall 24 of the truck bed 14). The lamp assembly 48 may include a camera 50 and a radar sensor 52 that are mounted within an applique 54 (see FIG. 3).

Each of the rear camera 44, the ultrasonic sensors 46, the camera 50, and the radar sensor 52 may collect data associated with the cargo 16 when the cargo 16 is positioned within the cargo space 12. The data may be received as input signals by the control module 42 for enabling the control module 42 to perform various functions, such as determining a distance D1 the cargo 16 extends beyond the perimeter 32 at the rear of vehicle 10, determining whether the cargo 16 has shifted during vehicle operation, determining whether the cargo 16 is equipped with the necessary tagging devices, determining whether the tagging devices are visible and/or properly illuminated in order to meet nighttime cargo-related regulations, etc.

The sensor system 34 may further include a first front camera 56 and a second front camera 58. The sensor system 34 could additionally include ultrasonic and/or radar sensors at the front of the vehicle 10. In an embodiment, the first front camera 56 may be part of a 360 degree camera system, and the second front camera 58 may be part of a lane departure system and/or lane keep assist system of the vehicle 10. The first front camera 56 and the second front camera 58 may collect data associated with the cargo 16 when the cargo 16 is positioned relative to a front portion of the vehicle 10. The data may be received as input signals by the control module 42 for enabling the control module 42 to perform various functions, such as determining a distance D2 the cargo 16 extends beyond the perimeter 32 at the front of vehicle 10, etc.

The sensor system 34 may additionally include a driver side camera 60 and a passenger side camera 62. The sensor system 34 could additionally include ultrasonic and/or radar sensors at the sides of the vehicle 10. The driver side camera 60 may be part of a 360 degree camera system adapted for monitoring the driver side of the vehicle 10, and the passenger side camera 62 may be part of a 360 degree camera system adapted for monitoring the passenger side of the vehicle 10. The driver side camera 60 and the passenger side camera 62 may collect data associated with the cargo 16 when the cargo 16 is positioned relative to either the driver side or the passenger side of the vehicle 10. The data may be received as input signals by the control module 42 for enabling the control module 42 to perform various functions, such as determining a distance D3 the cargo 16 extends beyond the perimeter 32 at the driver side of the vehicle 10, determining a distance D4 that the cargo 16 extends beyond the perimeter 32 at the passenger side of the vehicle 10, etc.

The sensor system 34 may further include an ambient light sensor 64 and a side door sensor 66 associated with both a driver side door 68 and a passenger side door 70 of the vehicle 10. The ambient light sensor 64 is configured to measure an intensity of ambient light for inferring either daytime or nighttime conditions, and the side door sensors 66 are configured to monitor an ajar status of the driver side door 68 and the passenger side door 70 and door window up/down status. Information from the ambient light sensor 64 and the side door sensors 66 may be received as input signals by the control module 42 for enabling the control module 42 to perform various functions, such as determining whether or not a blinking red light is required by the cargo-related regulations, confirming the cargo 16 at the driver and/or passenger side of the vehicle 10, determining whether the cargo 16 is protruding out of an open door window or out of an ajar door, etc.

The sensor system 34 described above is intended to be exemplary only and thus could include a greater or fewer number of sensors and different types of sensors than are specifically described. In addition, in this disclosure, any of the described sensors of the sensor system 34 could be configured as a single sensor or an arrangement of sensors or sensing devices adapted for a specific purpose.

The telecommunications module 36 is configured for achieving bidirectional communication between the cargo management system 30 and a cloud-based server system 72. The server system 72 may include a data repository 74 for storing cargo-related regulations or may subscribe to services or government servers that provide the same. The cargo-related regulations may include regulations by country, state/province, local municipalities, etc., and may include specific directives concerning how far the cargo 16 is permitted to extend beyond the perimeter 32 at each of the front, rear, and sides of the vehicle 10, whether the cargo 16 must be tagged by a cargo tagging device, etc.

The telecommunications module 36 may communicate over a cloud network 76 (i.e., the internet) to obtain various information stored on the server system 72. The server system 72 can identify, collect, and store user data associated with the vehicle 10 for validation purposes. Upon an authorized request, data may be subsequently transmitted to the telecommunications module 36 via one or more cellular towers 78 or via some other known communication technique (e.g., Wi-Fi, Bluetooth®, etc.). The telecommunications module 36 can receive data from the server system 72 or can communicate data back to the server system 72 via the cellular tower(s) 78. Although not necessarily shown or described in this highly schematic embodiment, numerous other components may enable bidirectional communication between the vehicle 10 and the server system 72.

The GPS 38 is configured to pinpoint an exact location of the vehicle 10, such as by using satellite navigation techniques. Among other uses, the control module 42 may utilize the location data from the GPS 38 to determine which cargo-related regulations are relevant to the vehicle 10 at any given time. In some embodiments, whenever the vehicle 10 enters a different local/state/province or federal location based on information of the GPS 38, the control module 42 may request an update from the cloud network 76 for data relevant to the new location. In this way, the vehicle 10 may remain apprised of all relevant cargo-related regulations even when communication with the server system 72 is subsequently lost.

The HMI 40 may be located within the passenger cabin 18 of the vehicle 10. The HMI 40 may include various user interfaces for displaying information to the vehicle occupants and for allowing the vehicle occupants to enter information into the HMI 40. The vehicle occupants may interact with the user interfaces via touch screens, tactile buttons, audible speech, speech synthesis, etc. In an embodiment, the HMI 40 is used to communicate information concerning the compliance or non-compliance of the cargo 16 being carried on the vehicle 10 with the cargo-related regulations to the vehicle operator.

The control module 42 may include both hardware and software and could be part of an overall vehicle control system, such as a vehicle system controller (VSC), or could alternatively be a stand-alone controller separate from the VSC. In an embodiment, the control module 42 is part of a body control module (BCM) of the vehicle 10 and is programmed with executable instructions for interfacing with and commanding operation of the various components of the cargo management system 30.

The control module 42 may include a processing unit 80 and non-transitory memory 82 for executing the various control strategies and modes of the cargo management system 30. The processing unit 80 may be configured to execute one or more programs stored in the memory 82 of the control module 42 based on the various inputs received from the sensor system 34, the telecommunications module 36, the GPS 38, etc.

A first exemplary program, when executed, may be employed by the control module 42 in order to determine the distance the cargo 16 extends beyond the perimeter 32 of the vehicle 10. This distance determination can be performed at each of the front, the rear, the driver side, and the passenger side of the vehicle 10 in order to monitor for any protruding cargo at all four sides of the vehicle 10.

When the cargo 16 is detected as being rear cargo, the camera 50 of the lamp assembly 48 may capture one or more images of the cargo 16. The control module 42 may analyze the captured image(s) using any suitable digital image processing technique, such as one that utilizes a digital signal processor (DSP), for example. The control module 42 may rely on fixed attributes of the cargo space 12, such as end verticals 84 of the side walls 22 and a horizontal edge 86 of the tailgate 26, for example, for establishing known dimensional reference points from which to compare the images of the cargo 16. The known dimensional reference points may be stored in the memory 82 of the control module 42. In some embodiments, the control module 42 may be configured to adjust rear and front park aid warnings to reflect the end of the cargo 16 as opposed to the end of the known dimensional references points of the vehicle 10 when cargo 16 is detected extending beyond the perimeter 32 of the vehicle 10.

One or more structures associated with the cargo space 12, such as an end cap of the tailgate 26, for example, may be made of or coated with a reflective material. The reflective material is configured to provide increased reflectivity such that the dimensional reference points are more easily detectable within the captured image(s).

A ratio may be derived from the captured image(s) and used as a baseline to estimate the distance D1 that the cargo 16 extends beyond the perimeter 32 of the vehicle 10. For example, two-dimensional aspects of the cargo 16 can be compared to two dimensional aspects of the known dimensional reference points of the vehicle 10 within the captured image(s) in order to estimate the distance D1 that the cargo 16 extends beyond the perimeter 32 at the rear of the vehicle 10.

The accuracy of the estimated distance D1 that the cargo 16 extends beyond the perimeter 32 at the rear of the vehicle 10 may be augmented or increased based on inputs the control module 42 receives from the rear camera 44, the ultrasonic sensors 46, and/or the radar sensor 52. In an embodiment, data received from the radar sensor 52 may aid the control module 42 in more accurately estimating the distance D1 by detecting the end points of the cargo 16. In another embodiment, the control module 42 can estimate the distance D1 that the cargo 16 extends beyond the perimeter 32 at the rear of the vehicle 10 based solely on the data received from the radar sensor 52.

When the cargo 16 is front cargo, either or both of the first front camera 56 and the second front camera 58 may capture one or more images of the cargo 16. The control module 42 may analyze the images using any digital imaging technique for determining the distance D2 that the cargo 16 extends beyond the perimeter 32 at the front of the vehicle 10.

When the cargo 16 is side cargo, the driver side camera 60 and/or the passenger side camera 62 may capture one or more images of the cargo 16. The control module 42 may analyze the images using any suitable digital image processing technique for determining the distance D3 that the cargo 16 extends beyond the perimeter 32 at the driver side or the distance D4 that the cargo 16 extends beyond the perimeter 32 at the passenger side of the vehicle 10. One or more ultrasonic sensors and/or radar sensors may optionally be employed to supplement the assessment of the side cargo.

A second exemplary program, when executed, may be employed by the control module 42 for assessing the regulatory compliance of the cargo 16. For example, the control module 42 may be programmed to compare the distances D1, D2, D3, and/or D4 derived using information from the sensor system 34 with relevant cargo-related regulations obtained from the server system 72. Location information from the GPS 38 may be used by the control module 42 for determining which cargo-related regulations are relevant to the vehicle 10.

A third exemplary program, when executed, may be employed by the control module 42 in order to detect positional changes (e.g., shifts) of the cargo 16, such as for ensuring continued compliance of the cargo 16 with the cargo-related regulations during vehicle operation. For example, one or more of the rear camera 44, the ultrasonic sensors 46, the camera 50, and the radar sensor 52 may monitor the position of the cargo 16 during vehicle motion and during stops. Based on inputs from one or more of these sensors, the control module 42 may compare the position of the cargo 16 with the position shown in one or more original captured images to determine whether the cargo 16 has shifted during transit and whether or not the shifting has resulted in the cargo 16 becoming non-complaint with the relevant cargo-related regulations.

A fourth exemplary program, when executed, may be employed by the control module 42 for determining whether to issue an alert for notifying the vehicle operator that the cargo 16 is non-compliant with the relevant cargo-related regulations. For example, the control module 42 may command an alert when it is determined that the cargo 16 is non-compliant in any way (e.g., distances D1-D4 exceed allowable distances beyond perimeter 32, cargo 16 is missing required tagging or lighting devices, required tagging device has blown off during vehicle operation, lighting device has stopped illuminating during vehicle operation, tagging or lighting devices of the cargo 16 are not visible, cargo securing devices (e.g., straps, etc.) have become loose or broken during vehicle operation, vehicle windows/doors are open and cargo is detected protruding therefrom, etc.). The alert may be in the form of an audible alert, a message displayed on the HMI 40, a message displayed on a personal electronic device 88 (e.g., a cell phone) of the operator of the vehicle 10, a message displayed on a computer 90 of an administrator when the vehicle 10 is an autonomous vehicle, etc.

Figure 4:
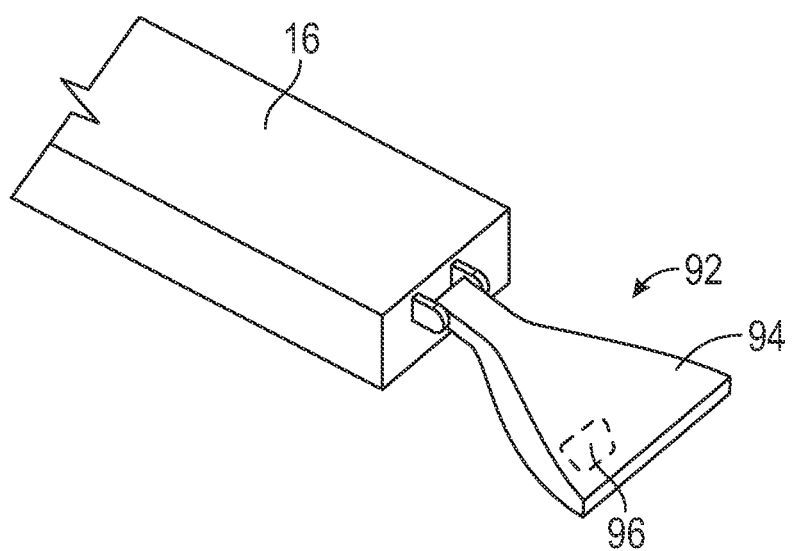
FIG. 4 illustrates a cargo tagging device for use with a vehicle cargo management system.

Referring now to FIG. 4, with continued reference to FIG. 2, a cargo tagging device 92 may optionally be secured to the cargo 16 in order for the cargo 16 to be detectable on the vehicle 10 even when it cannot be identified by various sensors and cameras of the sensor system 34 of the cargo management system 30. The cargo tagging device 92 may include a flag 94. The flag 94 may be made of or coated with a conductive plastic in order to improve its detectability, such as by the radar sensor 52 of the lamp assembly 48, for example. The flag 94 may be red in color and could include red long persistence phosphor so that it can charge via sunlight or passing headlights and glow for improved visibility.

The cargo tagging device 92 may additionally include a wireless device 96 imbedded within or otherwise secured to the flag 94. The wireless device 96 is configured to facilitate the detection of the cargo 16 by the sensor system 34. In an embodiment, the wireless device 46 is a Bluetooth® Low Energy (BLE) transceiver configured to receive and/or emit low energy Bluetooth® signals as a way to detect and communicate with the control module 42. In an embodiment, the control module 42 can detect the cargo tagging device 92 by using BLE triangulation techniques. However, other types of wireless devices (e.g., UWB, RIFU, etc.) and detection techniques (e.g., backscatter) are also contemplated within the scope of this disclosure.

Figure 5:
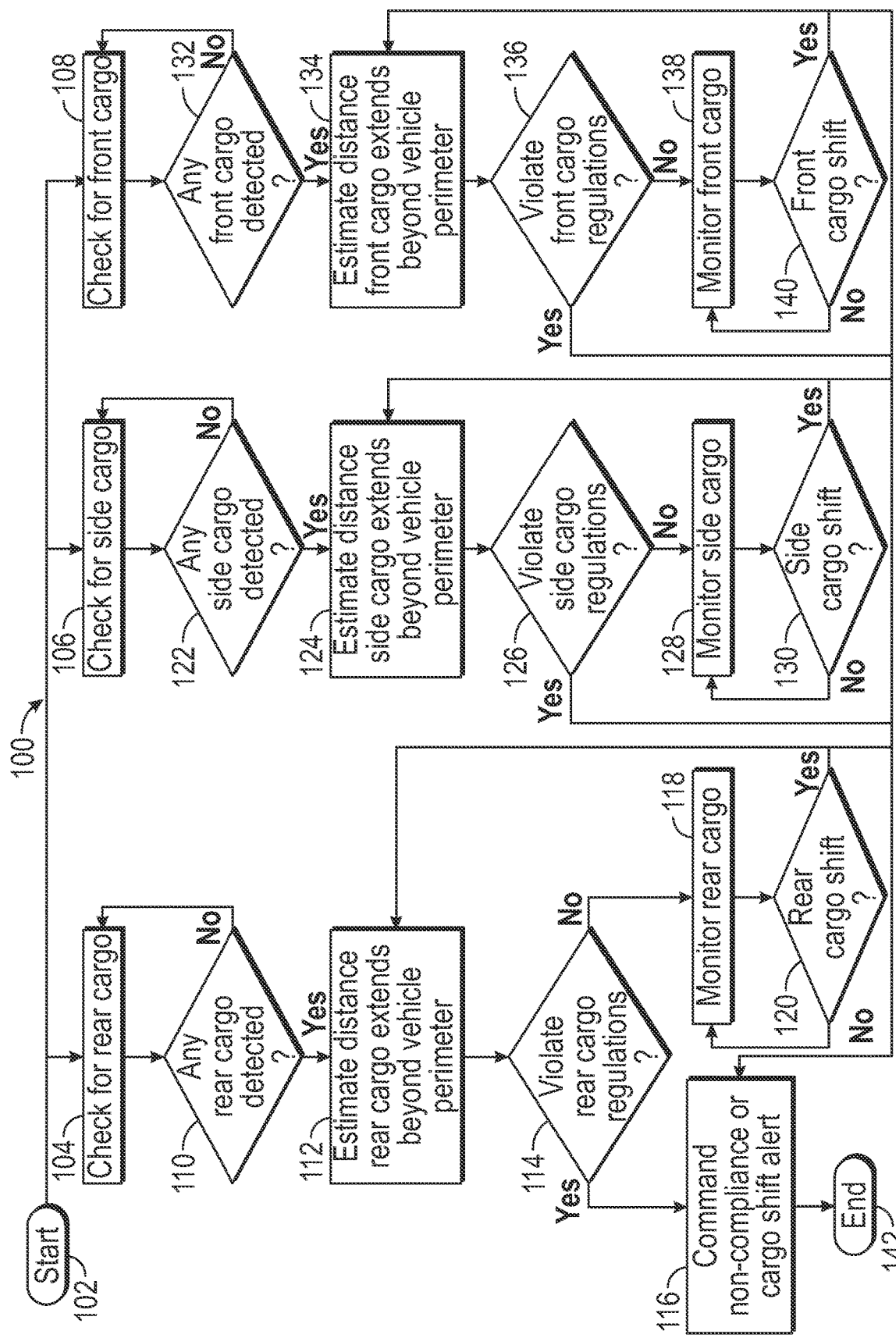
FIG. 5 schematically illustrates a method for monitoring the regulatory compliance of cargo positioned on a vehicle.

FIG. 5, with continued reference to FIGS. 1-4, schematically illustrates a method 100 for monitoring the regulatory compliance of cargo 16 on all sides of the vehicle 10. The control module 42 of the cargo management system 30 may be programmed with one or more algorithms adapted to execute the exemplary method 100. The method 100 may be stored as executable instructions in the memory 82 of the control module 42, and the executable instructions may be embodied within any computer readable medium that can be executed by the processing unit 80 of the control module 42.

The exemplary method 100 may begin at block 102. From block 102, the method 100 may simultaneously proceed to block 104 for monitoring rear cargo, to block 106 for monitoring front cargo, and to block 108 for monitoring side cargo.

At block 104, the method 100 may check for rear cargo positioned on the vehicle 10. The control module 42 may determine whether any rear cargo is detected at block 110 based on inputs from the sensor system 34. If rear cargo is detected, the method 100 may proceed to block 112 and the control module 42 may determine the distance D1 that the rear cargo extends beyond the perimeter 32 at the rear of the vehicle 10.

Next, at block 114, the control module 42 may determine whether the detected rear cargo violates any existing cargo-related regulations. If a YES flag is returned at block 114, the method 100 proceeds to block 116 and the control module 42 may command an alert for indicating non-compliance of a cargo-related regulation to the operator of the vehicle 10.

Alternatively, when a NO flag is returned at block 114, the method 100 may proceed to block 118 and the rear cargo may be continued to be monitored. The control module 42 may determine whether the rear cargo has shifted from its original position at block 120. If YES, the method 100 proceeds to block 116 and the control module 42 may command an alert notifying the operator of the vehicle 10 of the cargo shift.

At block 106, the method 100 may check for side cargo on the vehicle 10. The control module 42 may determine whether any side cargo is detected at block 122 based on inputs from the sensor system 34. If side cargo is detected, the method 100 may proceed to block 124 and the control module 42 may determine the distance D3 and/or D4 that the side cargo extends beyond the perimeter 32 of the vehicle 10 at each of the driver side and the passenger side.

Next, at block 126, the control module 42 may determine whether the detected side cargo violates any cargo-related regulations. If a YES flag is returned at block 126, the method 100 again proceeds to block 116, at which time the control module 42 may command an alert that indicates non-compliance of a cargo-related regulation to the operator of the vehicle 10.

Alternatively, when a NO flag is returned at block 126, the method 100 may proceed to block 128 by continuing to monitor the side cargo. The control module 42 may determine whether the side cargo has shifted at block 130. If YES, the method 100 again proceeds to block 116, and the control module 42 may command an alert notifying the operator of the vehicle 10 of the cargo shift.

At block 108, the method 100 may check for front cargo on the vehicle 10. The control module 42 may determine whether any front cargo is detected at block 132 based on inputs from the sensor system 34. If front cargo is detected, the method 100 may proceed to block 134 and the control module 42 may determine the distance D2 that the front cargo extends beyond the perimeter 32 of the vehicle 10 at the vehicle front.

Next, at block 136, the control module 42 may determine whether the front cargo violates any cargo-related regulations. If a YES flag is returned at block 136, the method 100 again proceeds to block 116, at which time the control module 42 may command an alert that indicates non-compliance of a cargo-related regulation to the operator of the vehicle 10.

Alternatively, when a NO flag is returned at block 136, the method 100 may proceed to block 138 and the front cargo is continued to be monitored. The control module 42 may determine whether the front cargo has shifted at block 140. If YES, the method 100 again proceeds to block 116, and the control module 42 may command an alert notifying the operator of the vehicle 10 of the cargo shift. The method 100 may end at block 142.

The vehicle cargo management systems and methods of this disclosure are capable of monitoring the regulatory compliance of vehicle cargo at all sides of the vehicle. The cargo management systems are capable of educating users when vehicle loads are or become non-compliant, capable of monitoring cargo loads during vehicle motion for ensuring compliance, and are capable of providing regulatory compliance monitoring to both normal drivers and autonomous vehicle operators.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A cargo management system for a vehicle, comprising:
   a sensor system adapted to detect an item of cargo located on the vehicle; and
   a control module in electronic communication with the sensor system and configured to estimate a distance the item of cargo extends beyond a perimeter of the vehicle and compare the estimated distance with a cargo-related regulation to confirm compliance of the item of cargo with the cargo-related regulation,
   wherein the cargo-related regulation includes a regulation established by a country, state/province, or local municipality associated with a location of the vehicle,
   wherein the control module is further configured to monitor for a positional change of the item of cargo during movement of the vehicle by comparing a current position of the item of cargo with a previously captured image of the item of cargo.

2. The cargo management system as recited in claim 1, wherein the sensor system includes a plurality of sensors and a plurality of cameras.

3. The cargo management system as recited in claim 2, wherein the sensor system includes at least one of a front camera, a rear camera, a side camera, an ultrasonic sensor, a radar sensor, or combinations thereof.

4. The cargo management system as recited in claim 1, wherein the sensor system includes a lamp assembly including a radar sensor and a camera.

5. The cargo management system as recited in claim 4, wherein the lamp assembly is a center high mounted stop lamp (CHMSL).

6. The cargo management system as recited in claim 1, comprising a telecommunications module adapted to achieve bidirectional communication with a server system having a data repository for storing the cargo-related regulation.

7. The cargo management system as recited in claim 1, comprising a global positioning system (GPS) configured to detect a location of the vehicle, and further wherein the control module is configured to determine whether the cargo-related regulation is relevant to the vehicle based on the location.

8. The cargo management system as recited in claim 1, wherein the control module is configured to command an alert in response to detecting the positional change of the item of cargo.

9. The cargo management system as recited in claim 1, comprising a cargo tagging device secured to the item of cargo and including a wireless device that is detectable by the control module.

10. The cargo management system as recited in claim 1, wherein the control module is configured to command an alert when the item of cargo is non-compliant with the cargo-related regulation.

11. The cargo management system as recited in claim 10, wherein the alert is an audible alert, a message displayed on a human machine interface of the vehicle, a message displayed on a personal electronic device of an operator of the vehicle, or a message displayed on a computer of an administrator of the vehicle.

12. A method, comprising:
   estimating, via a control module of a vehicle cargo management system, a distance an item of cargo extends beyond a perimeter of a vehicle;
   comparing, via the control module, the distance the item of cargo extends beyond the perimeter of the vehicle with a cargo-related regulation,
   wherein the cargo-related regulation includes a regulation established by a country, state/province, or local municipality associated with a location of the vehicle; and
   monitoring, via the control module, for a positional change of the item of cargo during movement of the vehicle,
   wherein monitoring for the positional change includes comparing a current position of the item of cargo with a previously captured image of the item of cargo.

13. The method as recited in claim 12, comprising:
   notifying an operator associated with the vehicle when the item of cargo is non-compliant with the cargo-related regulation.

14. The method as recited in claim 12, wherein the estimating includes:
   receiving, at the control module, a sensor input from a sensor system of the vehicle cargo management system.

15. The method as recited in claim 14, wherein the sensor input includes an image of the item of cargo captured by a camera.

16. The method as recited in claim 14, wherein the sensor input includes data concerning the item of cargo captured by a radar sensor.

17. The method as recited in claim 12, comprising:
   notifying an operator associated with the vehicle in response to detecting the positional change of the item of cargo.

18. The method as recited in claim 12, wherein the estimating includes:
   communicating with a cargo tagging device of the item of cargo in order to detect the item of cargo.

19. A cargo management system for a vehicle, comprising:
   a sensor system adapted to detect an item of cargo located on the vehicle; and
   a control module operably connected to the sensor system and configured to estimate a distance the item of cargo extends beyond a perimeter of the vehicle and compare the distance with a cargo-related regulation to confirm compliance of the item of cargo with the cargo-related regulation, wherein the cargo-related regulation includes a regulation established by a country, state/province, or local municipality associated with a location of the vehicle,
   wherein the control module is further configured to monitor for a positional change of the item of cargo during movement of the vehicle by comparing a current position of the item of cargo with a previously captured image of the item of cargo,
   wherein the control module is further configured to command an alert when the positional change causes the item of cargo to become non-compliant with the cargo-related regulation.

\* \* \* \* \*